United States Patent [19]
Johnson et al.

[11] Patent Number: 5,752,442
[45] Date of Patent: May 19, 1998

[54] METHOD FOR PRINTING A COLOR FILTER

[75] Inventors: Ronald E. Johnson, Tioga, Pa.; Candice Jo Quinn, Corning, N.Y.

[73] Assignee: Corning Incorporated, Corning, N.Y.

[21] Appl. No.: 554,304

[22] Filed: Nov. 8, 1995

Related U.S. Application Data

[63] Continuation-in-part of Ser. No. 145,155, Nov. 3, 1993, Pat. No. 5,535,673, and Ser. No. 197,141, Feb. 16, 1994, Pat. No. 5,544,582.

[51] Int. Cl.⁶ .................................... B41M 1/10; B41M 1/34
[52] U.S. Cl. ........................ 101/211; 101/32; 101/154; 101/175; 101/424.1
[58] Field of Search .................... 101/33–36, 38.1, 101/41, 150–154, 163, 170, 171, 174, 175, 211, 217, 424.1, 450.1, 483, 487, 488, 491–493, DIG. 43, 32; 156/235, 240, 277; 427/162, 165, 266, 287, 511

[56] References Cited

U.S. PATENT DOCUMENTS

| | | | |
|---|---|---|---|
| 4,035,214 | 7/1977 | Shuppert et al. | 156/240 |
| 4,209,551 | 6/1980 | Masaki et al. | 101/35 |
| 4,445,432 | 5/1984 | Ford, Jr. et al. | 101/152 |
| 4,549,928 | 10/1985 | Blanding et al. | 156/235 |
| 4,836,102 | 6/1989 | Cicci | 101/41 |
| 5,127,330 | 7/1992 | Okazaki et al. | 101/450.1 |
| 5,514,503 | 5/1996 | Evans et al. | 430/7 |
| 5,533,447 | 7/1996 | Johnson et al. | 101/211 |
| 5,535,673 | 7/1996 | Bocko et al. | 101/211 |
| 5,540,147 | 7/1996 | Johnson | 101/211 |
| 5,544,582 | 8/1996 | Bocko et al. | 101/211 |

FOREIGN PATENT DOCUMENTS

| | | | |
|---|---|---|---|
| 61-284441 | 12/1986 | Japan | 101/424.1 |
| 119091 | 5/1987 | Japan | 101/154 |
| 280804 | 12/1987 | Japan . | |
| 175252 | 7/1990 | Japan . | |
| 264503 | 9/1992 | Japan . | |
| 5-147359 | 6/1993 | Japan . | |
| 95/12494 | 5/1995 | WIPO . | |

OTHER PUBLICATIONS

Katsuhiko Mizuno and Satoshi Okazaki, "Printing Color Filter for Active Matrix Liquid–Crystal Display Color Filter", Japanese Journal of Applied Physics, vol. 30, No. 11B, Nov. 1991, pp. 3313–3317.

*Primary Examiner*—Stephen R. Funk
*Attorney, Agent, or Firm*—Robert L. Carlson

[57] ABSTRACT

A method of making color filters for liquid crystal display panels. A multicolored ink pattern is formed on a collector device, then hardened or cured while on the collector device. The multicolored pattern is then applied to a substrate using a suitable adhesive.

16 Claims, 5 Drawing Sheets

METHOD FOR PRINTING A COLOR FILTER

RELATED APPLICATIONS

This application is a Continuation-In-Part of U.S. Pat. application Ser. No. 08/145,155, filed Nov. 3, 1993, now U.S. Pat. No. 5,535,673, titled COLOR FILTER AND METHOD FOR PRINTING, and a Continuation-In-Part of Ser. No. 08/197,141, filed Feb. 16, 1994, now U.S. Pat. No. 5,544,582, titled METHOD FOR PRINTING A COLOR FILTER.

FIELD OF THE INVENTION

The invention relates to color filters for liquid crystal display panels and methods for their production.

BACKGROUND OF THE INVENTION

Liquid crystal display (LCD) panels, particularly color LCD panels, are used for flat screen televisions, projection television systems and camcorder view finders, with many more applications anticipated in the future.

The fabrication of an active matrix liquid crystal display typically involves several steps. In one step, the front glass panel is prepared. This involves deposition of a color filter element onto a suitable substrate, such as glass. Color filter deposition typically involves depositing a black matrix pattern and three primary (typically either red, green and blue or yellow, magenta and cyan) color dot or color cell patterns within the spaces outlined by the black matrix. The printed lines which form the black matrix typically are about 15–25 microns wide and about 0.5 to 2 microns thick. The red, green, and blue color cells are typically on the order of about 70–100 microns in width by 200 to 300 microns in length. The color cells are typically printed in films less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyimide alignment layer over the color filter element. The transparent conducting layer is typically indium tin oxide (ITO), although other materials can also be utilized.

In a second step, a separate (rear) glass panel is used for the formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal panel.

One critical step in the manufacture of the color filter is the preparation of the black matrix and color filter pattern. The sharpness of edge definition of the black matrix is extremely important. Unlike the colored ink cells, any variation in the black matrix edge, due to printing flow and so forth, is readily discernable when inspecting the final product. The color pixel edge, on the other hand, is typically hidden by the black matrix pattern. Consequently, to a certain extent the black matrix hides variability in the color pixel edge, while there is nothing to hide variability in the black matrix.

Consequently, black matrix patterns are typically prepared using photolithographic techniques, even where the remainder of the color filter pattern is produced using printing techniques. Photolithographic techniques involve a large number of production steps, and are much more complex than printing methods. In addition, photolithographic techniques are typically much more expensive than ink printing techniques.

Another critical step in color filter formation is the formation of the red, green and blue color dots (also referred to as color cells) of the color filter. Such color cells preferably should be deposited so that they are as smooth and uniform in thickness as possible. Previous attempts to print color filter patterns have resulted in color patterns having insufficient smoothness. This is largely because the ink depositing methods of the prior art resulted in ink cells which were rounded or triangular in cross section. Consequently, a planarizing layer is commonly applied over the color patterns to alleviate imperfections in coating smoothness or thickness uniformity due to the deposition process. The transparent planarizing layer also serves to protect against ion migration to and from the ITO layer and color pattern layer. The planarizing layer should be deposited to be as smooth and flat as possible.

To facilitate deposition of a flat planarizing layer, it is desirable that the color patterns be smooth, flat and substantially parallel to the undersurface of the glass substrate. Uniform thickness color patterns are desirable for obtaining optimum display contrast and color performance, because if the thickness of the pattern varies, the transmitted light intensity will vary.

One other problem with forming multicolored ink color filter patterns is preventing the different colored inks from mixing with one another. In the past, this problem has been solved by depositing the colors and drying them one at a time.

International Patent Publication No. WO 95/12494 describes a process for making color filters wherein a multi-colored ink pattern is deposited onto a transfer layer which is carried by a collector roll. The composition multi-colored pattern/transfer layer is then transferred to a glass substrate to form a color filter. Preferably, the multi-colored ink pattern is flattened during deposition to the substrate and deformed to a more uniform shape.

It would be desirable to provide alternative methods for making high quality color filters having uniform thickness black matrix patterns, as well as ink color filter arrays, which have improved resolution and registration, and which can be obtained easily and at a lower cost than prior art color filter arrays. It would also be desirable to achieve these qualities using a process which takes less steps than current processes.

SUMMARY OF THE INVENTION

The present invention relates to methods for forming a color filter, particularly color filters for liquid crystal display applications. In the present invention, a multi-colored ink pattern is deposited onto a collector device, such as a collector roll. This multicolored pattern is then hardened while on the collector roll. At this point, the hardened pattern is a color filter component, which can be removed from the collector roll and utilized as desired. For example, such color filter components could be sold to flat panel display manufacturers, who could then adhere them to a suitable substrate as desired. In a preferred embodiment, however, the color filter is transferred to the substrate immediately after forming on the collector roll, using a suitable adhesive. Preferably, the multicolored pattern is cured under compression while on the collector roll, to facilitate achieving a uniform thickness ink pattern while on the collector roll, after which the ink is transferred to a substrate using a suitable adhesive.

Preferably, prior to forming the multicolored pattern on the collector, a raised pattern is formed on the collector roll, and the individual colored ink patterns that make up the color filter are deposited within the recesses formed by the raised pattern. Preferably, the raised pattern is formed using mechanical forming techniques. By mechanical forming techniques, it is meant that the raised pattern is formed mechanically, such as by intaglio printing techniques, as opposed to photolithographic and other chemical forming techniques, wherein a portion of material is removed chemically after formation.

In a preferred embodiment, a transfer layer is provided on a collector device, such as, for example, a collector roll or collector plate. A raised pattern, which preferably corresponds to the desired black matrix pattern, is then formed on the transfer layer. The individual red, green, and blue color cells are then deposited on the transfer layer, within the recesses formed by the raised pattern, to form a color filter pattern. The ink is deposited within the black matrix pattern utilizing typographic ink imaging pins, which preferably are smaller than the spaces formed by the black matrix, to facilitate deposition of the ink within the recesses formed by the raised pattern without smearing the ink on the black matrix or mixing of the different colored inks. It is also acceptable for the inks to overflow from the recesses to some extent, as such partial separation of the colored inks is still beneficial. The multicolored ink pattern is then preferably hardened under compression while on the collector. The transfer layer in this way provides a unique support for a color filter component product in which the hardened color filter pattern is supported by the transfer layer. Such a component can be stored or shipped as desired before being attached to a final substrate. Preferably, however, such color filters are transferred, immediately after being formed on the collector, to a substrate using a suitable adhesive. The entire composite (transfer layer and color filter pattern) is then transferred to the substrate using a suitable adhesive. The transfer layer in this way ends up on top of the color filter, and acts as a planarizing and/or protective layer. The raised pattern on the transfer layer helps maintain separation of the color cells during deposition of the ink into the cells, as well as after the transfer to the substrate.

In one embodiment utilizing the transfer layer concept, prior to receiving the color cells which make up each pixel of the color filter, the transfer layer is contacted with a roll or plate having a recessed pattern thereon corresponding to the desired black matrix pattern. This results in the formation of a raised pattern on the transfer layer which corresponds to the desired black matrix pattern. If desired, black matrix ink may be applied to the top of the raised pattern to form the raised black matrix pattern.

In a preferred embodiment which utilizes the transfer layer concept, a black matrix ink pattern is formed within the recesses of an intaglio imaging surface, such as that provided by an imaging roll or plate having a recessed pattern thereon which corresponds to the desired black matrix pattern. The black matrix ink is preferably cured or hardened, prior to or during deposition to the transfer layer, to precisely duplicate the shape of the intaglio recessed pattern. Ink in intaglio and gravure print plates typically has a negative meniscus, the surface of the ink in the recessed intaglio pattern curving below the print plate surface. Consequently, the transfer layer is preferably liquid when it contacts the black matrix ink, so that it can contact and adhere to the black matrix ink. The liquid transfer layer is cured while in contact with the black matrix ink and thereby removes the cured or hardened ink from the recesses of the intaglio print pattern.

Preferably, the colored ink is deposited into the cells using ink imaging pins which have a smaller size than the cell size formed by the black matrix pattern. For example, in a cell having dimensions of approximately 50 by 175 microns, the typographic ink imaging pin should have a dimension in which the width is between 20 and 40 microns and the length is between 140 and 160 microns.

The transfer layer may be formed using, for example, polyimides, epoxides, acrylics, vinyl ethers, polyurethanes, polyesters, and acrylated or methacrylated acrylics, esters, urethane, epoxides and other materials which are conventionally useful as planarizing layers in conventional color filter devices. A preferred material for the transfer layer is a radiation curable acrylate material, such as a radiation curable epoxy acrylate. Preferably, the transfer layer is formed of a radiation curable material so that it may be cured while receiving the ink pattern which makes up the black matrix pattern. The transfer layer is deposited onto a collector device as a thin film, typically less than 10 microns.

Suitable adhesives include those materials listed above as being suitable for the transfer layer. Such materials, as well as other suitable adhesive materials, should be formulated to either exhibit sufficient tack to adhere the color filter pattern to the glass substrate by causing intimate contact, or which are rapidly hardenable to cohesive solids when the two surfaces are brought into intimate contact. The former type includes the families of pressure-sensitive adhesives, many of which are acrylic or silicone polymer based. They generally consist of a soft, low $T_g$ polymer, often elastomeric, in conjunction with tackifiers, plasticizers, and so forth which are formulated to exhibit sufficient tack to adhere to surfaces upon causing intimate contact under pressure. The second type includes radiation curable adhesives, anaerobic acrylic and polyester adhesives, cyanoacrylates, and so forth. In all cases, the adhesives may be formulated such that a secondary curing operation, such as a thermal post cure, can be utilized to enhance the durability properties of the materials.

The methods of the present invention result in a number of advantages over prior art methods for forming black matrix patterns. Because the color ink dot patterns are cured under compression, the thickness uniformity of the pixels is better than that of many prior art methods. In addition, it is possible to produce extremely accurate black matrix patterns having well defined square edges. As a result, the definition of the black matrix patterns of the present invention is much improved over the prior art. Also, because the transfer layer acts as an in-situ formed planarizing layer, no subsequent operation is needed to form a planarizing layer.

DETAILED DESCRIPTION OF THE INVENTION

Figure 1:
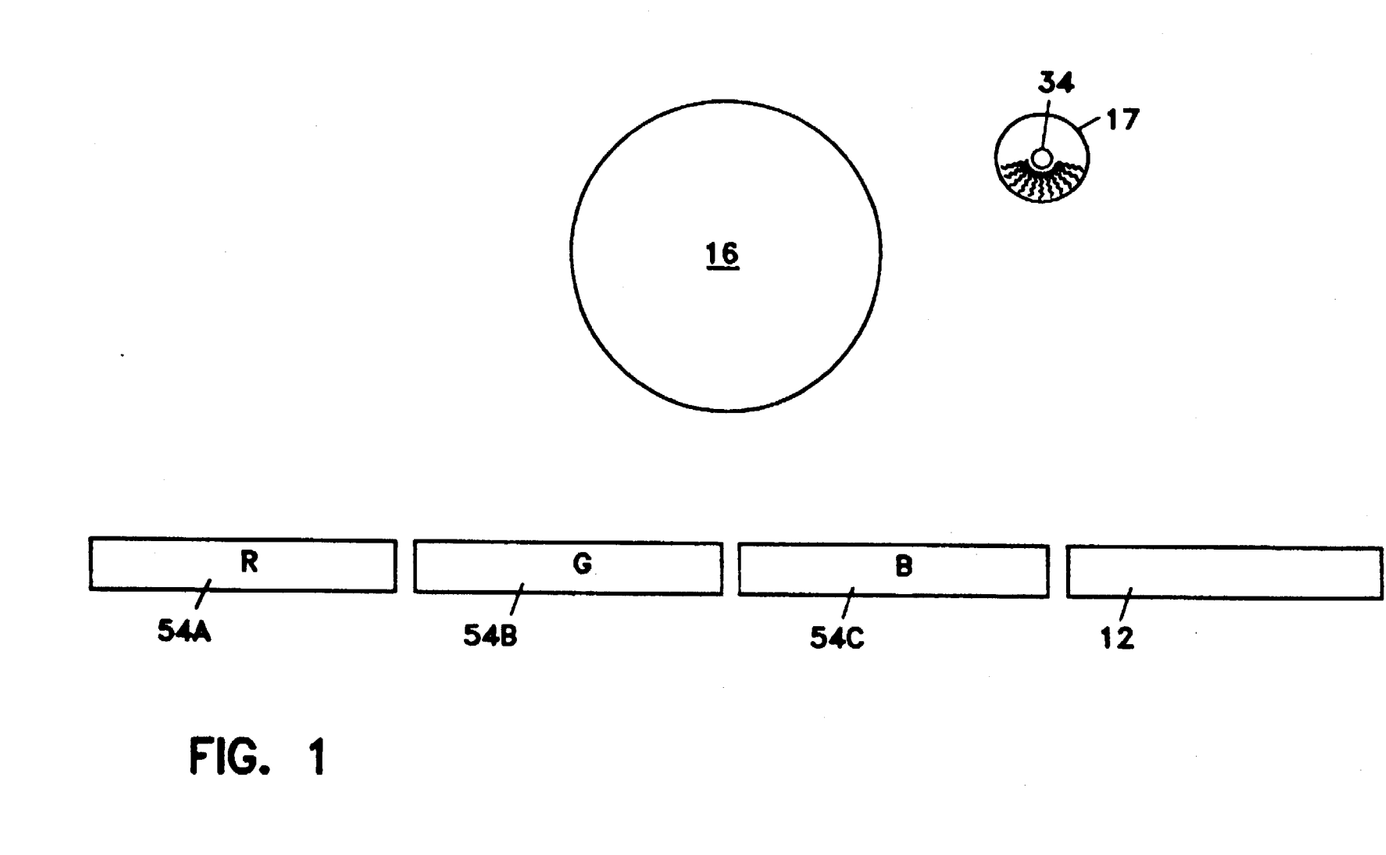
FIG. 1 illustrates a printing apparatus for carrying out the method of the present invention.

In FIG. 1, a collector roll 16 is contacted with ink imaging plates 54A, 54B, and 54C, which carry the red, green and blue ink, respectively, on their image forming surfaces. Of course, collector roll 16 could alternatively be a collector plate. In this way, a multicolored ink pattern 15 such as, for example, a color filter for an LCD, can be formed on collector roll 16.

Figure 2:
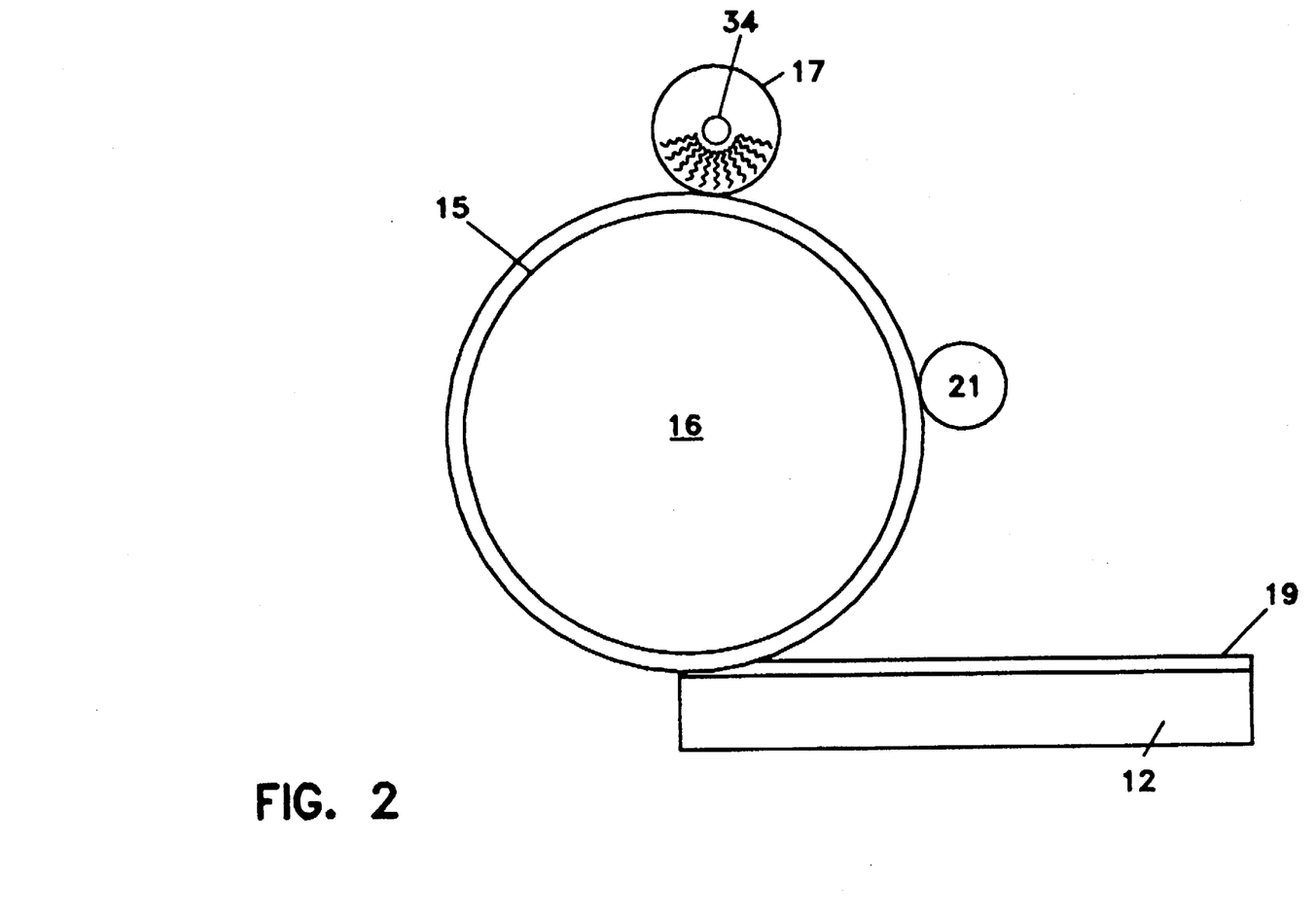
FIG. 2 illustrates the deposition of a multi-colored ink pattern onto a substrate in accordance with the invention.

This multicolored pattern is then cured or otherwise hardened on the collector roll. Preferably, as illustrated in FIG. 2, multicolored pattern 15 is contacted and compressed by smoothing roll 17 to smooth the ink patterns on the collector roll. Preferably, simultaneous with the contacting step by smoothing roll 17, the multicolored pattern is cured or hardened, such as by radiation from UV light 34 which is positioned within smoothing roll 17. The compression deforms the ink to a more uniform dot shape. Curing the ink while under compression (compression curing) helps retain this more uniform shape. After being cured or hardened on the collector roll 16, the color filter pattern can be removed from the collector roll 16 and used as a color filter layer component which may be stored or transferred as desired for lamination to a suitable substrate. In a preferred embodiment, as illustrated in FIG. 2, immediately after being formed on the collector, the multicolored pattern 15 is transferred to a suitable substrate using an adhesive 19. The adhesive may be applied to the substrate 12 prior to the transfer step. Alternatively, adhesive 19 could be applied to the multicolored pattern 15, prior to being deposited to the substrate, by adhesive applicating roll 21. While FIG. 2 illustrates the deposition of a color filter pattern to a substrate, a similar process could be employed by a flat panel display or other manufacturer having a need for a color filter, wherein the color filter component is adhered to a desired substrate using adhesives.

While FIG. 1 illustrates the use of a smoothing roll 17, a smoothing plate could alternatively be employed, in which case the smoothing plate is preferably transparent and a radiation source is positioned behind smoothing plate 17 to emit radiation and enable curing of the ink while under compression from the smoothing plate.

In the preferred embodiment of the present invention, a transfer layer is deposited onto a collector device, such as a collector roll or plate. The transfer layer is preferably then embossed or otherwise modified to form an upraised pattern on the transfer layer. This upraised pattern could be, for example, a raised black matrix pattern, or a raised pattern which corresponds to the desired black matrix pattern. The red, green and blue color dot patterns are deposited within the recesses formed by the raised pattern on the transfer layer, and the color cells are then hardened or cured. The resultant composite, which consists of the transfer layer, a raised pattern (which may or may not be the black matrix pattern) and color cells is transferred in one step to the glass substrate using an adhesive.

The transfer layer provides a unique surface on which to form the black matrix pattern and each of the red, green and blue (or yellow, magenta, and cyan) color dot patterns. Forming the color filter pattern on a transfer layer enables the entire assembly, consisting of the transfer layer, black matrix pattern and color dot patterns, to be transferred to a substrate so that the color filter is sandwiched between the transfer layer and the substrate. Because the transfer layer acts as an in-situ formed planarizing layer, no subsequent operation is needed to a form a planarizing layer. Such transfer layers are further discussed in commonly owned U.S. Pat. application Ser. No. 08/197,141 now U.S. Pat. No. 5,544,582, the specification of which is hereby incorporated by reference. The transfer layer may be formed using, for example, materials selected from the group consisting of polyimides, epoxides, acrylics, vinyl ethers, polyurethanes, polyesters, and acrylated or methacrylated acrylics, esters, urethane, or epoxides, and other materials which are conventionally useful as planarizing layers in conventional color filter devices. A preferred material for the transfer layer is a radiation curable acrylate material, such as a radiation curable epoxy acrylate. The transfer layer is deposited onto the collector as a thin film, typically less than 10 microns. Preferably, the transfer layer is formed of a radiation curable material to facilitate curing.

Figure 3:
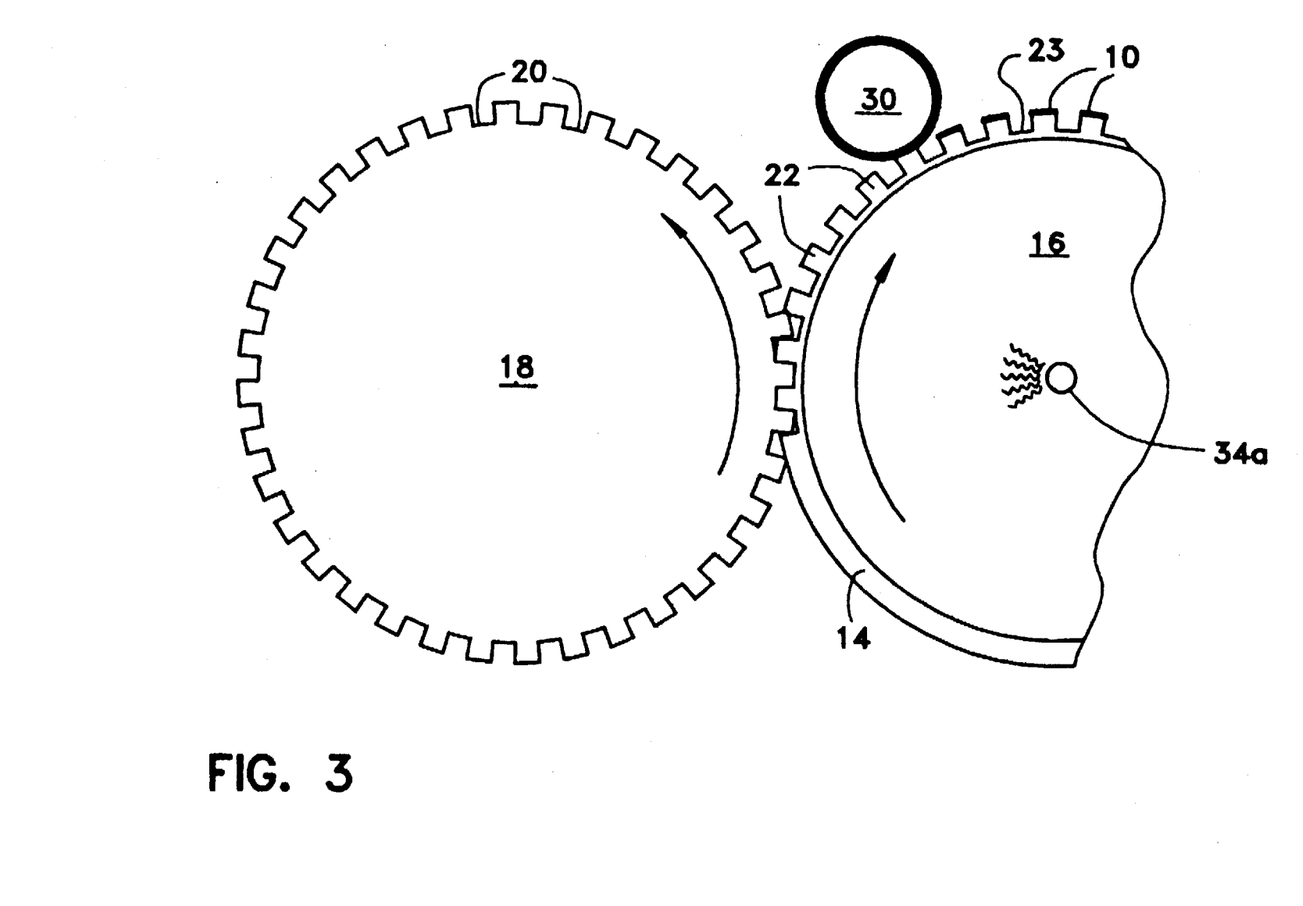
FIG. 3 illustrates an apparatus for forming a raised black matrix pattern on the collector roll prior to receiving the colored inks.
Figure 4:
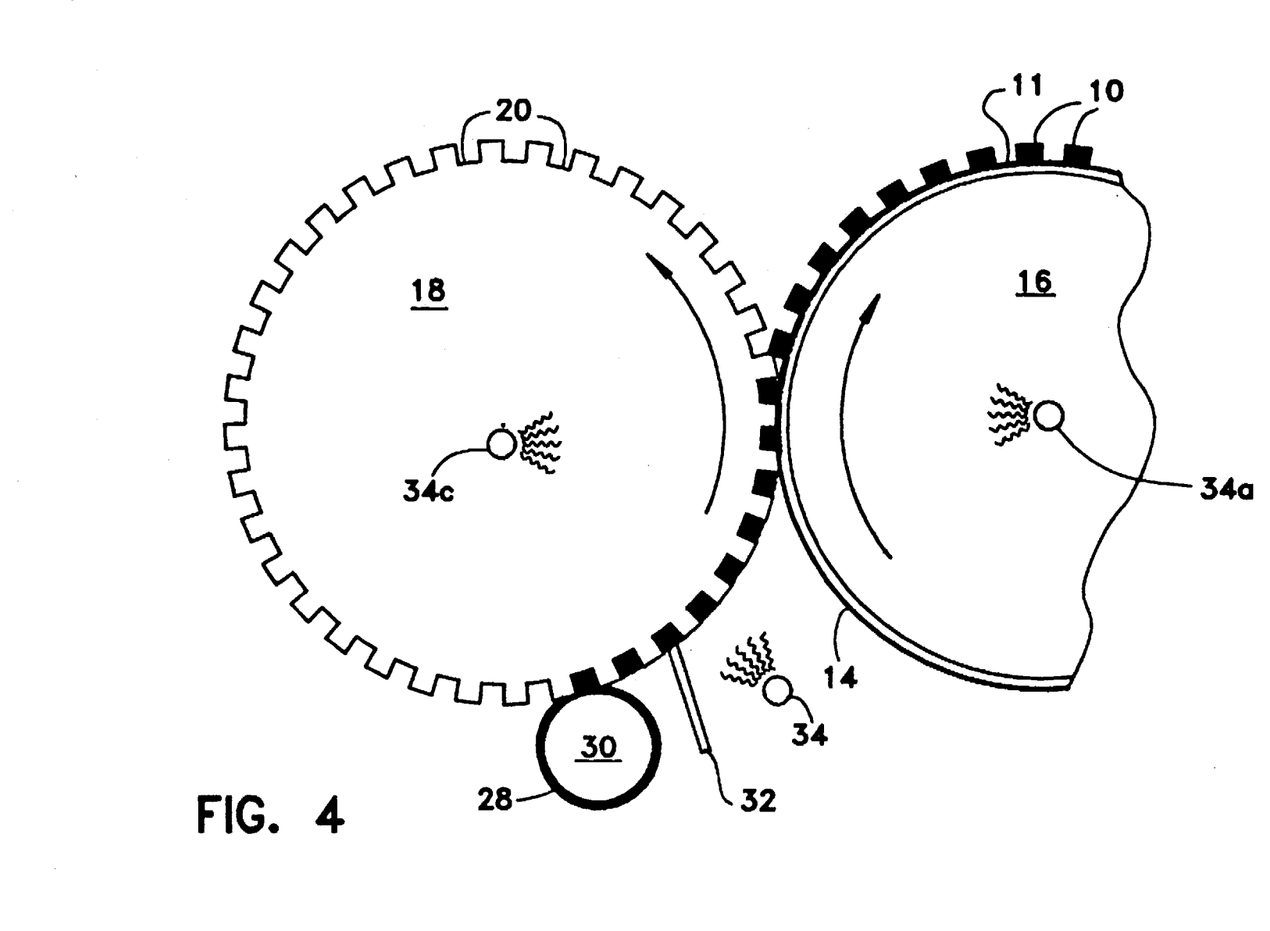
FIG. 4 illustrates an alternative apparatus for forming a raised black matrix pattern.

In FIGS. 3 and 4, transfer layer 14 is applied to a collector roll, and then a raised pattern is formed on transfer layer 14. The raised pattern can be formed on transfer layer 14 using a variety of techniques. For example, in FIG. 3, transfer layer 14 is contacted by patterned intaglio roller 18 (with no ink thereon) while transfer layer 14 is in a deformable state. Patterned intaglio roller 18 has a recessed pattern 20 thereon corresponding to the desired black matrix pattern. As a result, patterned intaglio roller 18 (which could alternatively be an intaglio plate) contacts the deformable transfer layer 14 and forms raised pattern 22, which corresponds to the desired black matrix pattern 10. Raised pattern 22 defines recessed pattern 23 on transfer layer 14. Transfer layer 14 is hardened sufficiently to retain the embossed pattern obtained from roll 18. This can be accomplished by utilizing thermoplastic inks and cooling the transfer layer, at the point of contact with roll 18, to set the ink. Alternatively, and more preferably, radiation curable inks are employed, and radiation emitted from ultraviolet light 34a through roll 16 to cure the transfer layer 14 during the embossing operation. Black matrix ink may then be applied, by ink applicating roll 30, to raised pattern 22 to form a raised black matrix pattern 10.

The apparatus in FIG. 4 is similar to that illustrated in FIG. 3. However, intaglio roller 18 is now used as a black matrix ink patterning roll. The intaglio roller 18 in FIG. 4 has ink receiving recessed pattern 20 thereon, which receives radiation curable, thermal wax, or solvent based black matrix ink 28. In a preferred embodiment, ink applicating roller 30 applies radiation curable black matrix ink 28 into recessed pattern 20. Excess ink is removed from the pattern by doctor blade 32. The ink is then cured or set within recessed pattern 20, such as, for example, by exposure to ultraviolet radiation from UV lamp 34, thereby forming a black matrix pattern 10 which will at least substantially retain the shape of the recessed pattern 20. Alternatively, in a preferred embodiment, intaglio roll 18 is constructed of radiation transparent material, and a UV light 34c is mounted therein to cure or partially cure the black matrix ink while it is retained within recessed pattern 20. Such curing or setting of the black matrix ink could alternatively take place simultaneous with contact of the black matrix ink with the transfer layer. For example, the black matrix ink could be cured by radiation from UV light 34a. When the curing or hardening of the black matrix ink is accomplished, the black matrix is sufficiently hardened so that the ink at least substantially retains, and preferably completely retains, the exact shape of recessed pattern 20. Black matrix patterning roller 18 is then contacted with transfer layer 14 to transfer the cured or otherwise hardened black matrix pattern 10 from recessed pattern 20 on patterning roller 18 to transfer layer 14 on collector roll 16. This results in a black matrix pattern on transfer layer 14. The transfer layer is preferably smooth, and preferably liquid prior to receiving the black matrix ink. It is important that the intaglio imaging surface be more releasing than the collector surface. Ink in intaglio and gravure print plates typically have a negative meniscus, the surface of the ink in the recessed intaglio pattern curving below the print plate surface. Consequently, the transfer layer must be sufficiently soft and tacky to contact and adhere to the black matrix ink and remove the ink from the recesses of the intaglio print pattern.

Using the embodiment illustrated in FIG. 4, wherein the black matrix pattern is cured while retained in the recessed pattern of intaglio roller 18, the resolution of the black matrix pattern is dependant upon the depth and shape of recessed pattern 20 and how well this shape is imparted to the black matrix pattern 10. By setting or curing black matrix pattern 10 while it is still contained within recessed pattern 20, the black matrix pattern will necessarily acquire the square edges and corners of the recessed pattern. Thus, the processes of the present invention avoid the irregular, triangular or rounded corners and edges which are typical of conventional ink printing techniques.

Alternatively, the black matrix ink 28 can be applied at a different location in the process of manufacturing the liquid crystal display panel. For example, the black matrix ink can be applied on the other (TFT) glass substrate. If desired, the black matrix pattern can be deposited on top of the thin film transistor. For applications in which the black matrix pattern is deposited on the TFT substrate, it is felt that formation of the raised pattern 22 on transfer layer 14 is very desirable, in order to separate and align the various red, green, and blue color cells with the black matrix pattern. By then registering the black matrix pattern 10 to align with raised pattern 22, when one looks down at the resultant liquid crystal display, the color cells will appear to be within the black matrix pattern.

Completion of the color filter involves formation of the color pixels. Each color pixel typically consists of a red, green, and blue subpixel (subpixels are also herein referred to as color cells). In all of the above described embodiments, after the raised pattern 10 (or raised black matrix pattern 10) has been applied to transfer layer 14, the red, green and blue color cells of the color filter pattern are applied to transfer layer 14 within the recesses 11 formed by raised pattern 10. Preferably, the red, green and blue color cells are deposited within black matrix pattern 10 using typographic ink printing techniques. After deposition of the red, green and blue color ink cells within raised pattern 10, the colored inks are hardened or cured while on the collector. Preferably, the colored inks are hardened by curing them under compression while simultaneously being smoothed by a smoothing roll or plate, as illustrated in FIG. 1.

To facilitate the smoothing operation, the surface of the smoothing device should be coated with a release agent. A preferred release agent for the smoothing device is TEFLON AF (tetrafluoroethylene), a material which is transparent and unaffected by UV radiation.

The entire composite, which consists of transfer layer 14, raised pattern 10, and red, green and blue color cells 36, is then transferred to a glass substrate 12 using a suitable adhesive 19. Suitable adhesives materials include those described above for the transfer layer, or the unpigmented mediums (vehicles) employed in formulating sub-pixel inks. The adhesive layer should be liquid prior to contacting the color filter composite and glass, and is cured or hardened during or soon after (most preferably during) transfer of the composite to the glass substrate 12. Such curing may be accomplished by employing ultraviolet radiation curable material to form the adhesive layer, and applying radiation to the adhesive layer during deposition of the composite to the substrate.

Figure 5:
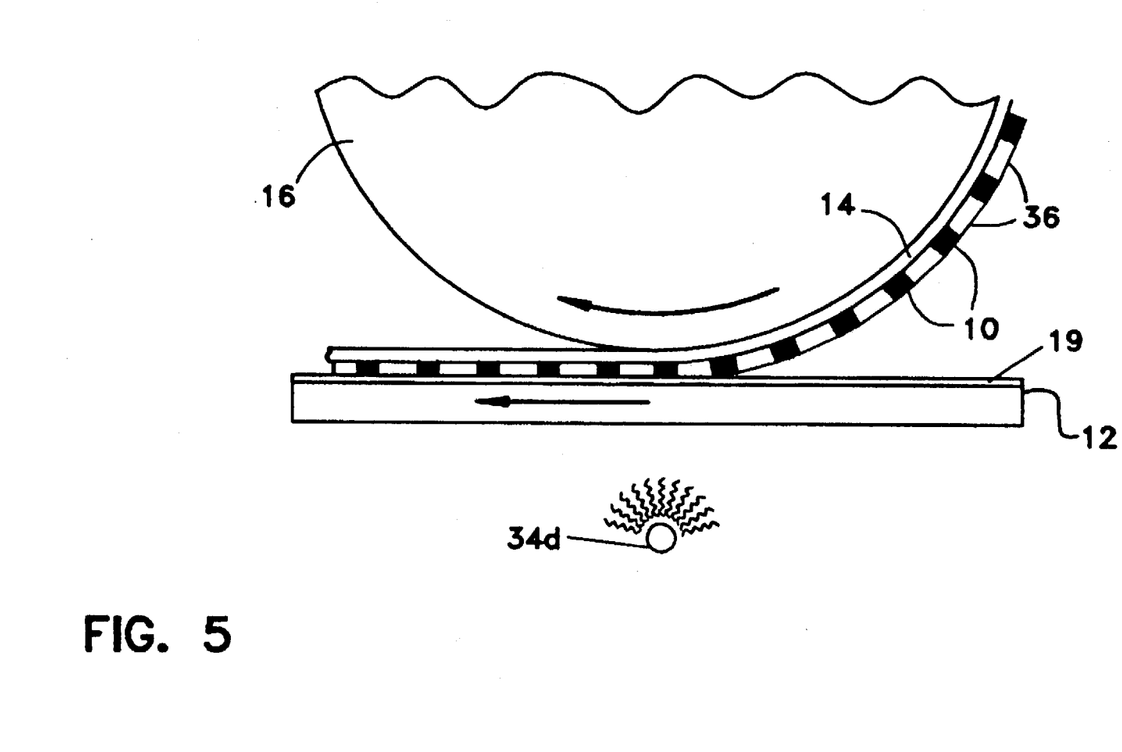
FIG. 5 illustrates the deposition of a color filter pattern, formed in accordance with the present invention, to a glass substrate.

FIG. 5 illustrates the deposition of a black matrix pattern 10, color filter pattern 36, and transfer layer 14 to a glass substrate 12. The composite illustrated in FIG. 5 consists of black matrix pattern 10, which was formed using the method illustrated in FIG. 4, as well as color filter pattern 36. As explained above, the composite is adhered using adhesive 19. Preferably, adhesive 19 is UV curable and is cured during or soon after deposition to the substrate. Such curing can be accomplished via UV light 34d, which is positioned to emit radiation through the glass substrate.

For embodiments in which an ink (black matrix and/or color ink) is cured, the ink is preferably formulated to be radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent.

Color filters typically require approximately 15-25 micron width black matrix lines, and small color cells which are typically on the order of about 70-100 microns in width by 160 to 300 microns in length. The color cells are typically printed in films less than about 10 microns thick, and preferably less than 5 microns thick. These thin color cells must be evenly applied and accurately registered within the black matrix patterns. In carrying out the present invention, conventional radiation-curable inks are generally preferred over thermoplastic inks, partly because they can be printed at lower viscosities, which helps in printing such thin cells. Also, it is more difficult to control the pattern registration of hot melt thermoplastic inks, as they require extremely tight thermal tolerances to control pattern dimensions. In addition, radiation curable inks are easily cured during compression transfer operations in accordance with the invention. Thermoplastic inks do have at least one advantage, in that they can be formulated to set up immediately upon deposition to a substrate or transfer roll having a lower temperature, resulting in less pinholes, film non-uniformities and other such defects which can be caused by inadequate wetting of transfer surfaces. Consequently, another preferred type of ink is one that displays both thermoplastic and radiation curable properties. Such an ink is one which is formulated to be thermoplastic until printed to the substrate, at which point it can be cured by exposure to appropriate radiation. Cross-linking of the ink increases its durability and resistance to higher temperatures, which is preferable due to the temperatures the color filter will be exposed to in subsequent processing steps. For the black matrix ink, another preferred type of ink is a solvent based formulation in which a volatile solvent is incorporated into the ink to lower the viscosity during inking and doctoring, the solvent being chosen so that it is compatible with the ink and readily evaporated from the thin (preferably 2 to 5 micron) black matrix pattern in the intaglio plate before contact with the transfer layer. The ink may then undergo crosslinking during subsequent radiation or thermal cure.

Although the invention has been described in detail for the purpose of illustration, it is understood that such detail is solely for that purpose and variations can be made therein by those skilled in the art without departing from the spirit and scope of the invention which is defined by the following claims.

For example, in the embodiments illustrated herein, the color patterns are generally described as being formed on a collector roll 16. However, the present invention is not limited to collector rolls, and thus other types of collector devices, such as plates, could also be utilized. Likewise, wherein some of the embodiments illustrated herein utilize flat imaging plates, imaging rollers could also be employed, and in fact are in some cases preferred.

What is claimed is:

1. A method for making a color filter for a flat panel display, comprising:

forming a multicolored pattern on a collector device;

hardening the multicolored pattern while on the collector device and prior to or during said hardening, contacting the multicolored pattern with a smoothing device to smooth the multicolored pattern while on the collector device; and removing the multicolored pattern from the collector device to form a color filter component.

2. The method of claim 1, further comprising:

depositing the multicolored pattern to a substrate to form a color filter.

3. The method of claim 2, wherein said depositing step comprises utilizing an adhesive to deposit the multicolored pattern to the substrate.

4. The method of claim 3, wherein said method further comprises applying said adhesive to the substrate prior to said depositing step.

5. The method of claim 3, wherein said method further comprises applying said adhesive to the multicolored pattern prior to said depositing step.

6. The method of claim 3, wherein said adhesive utilizing step comprises utilizing adhesives selected from the group consisting of polyimides, epoxides, acrylics, vinyl ethers, polyurethanes, polyesters, and acrylated or methacrylated acrylics, esters, urethane, and epoxides.

7. The method of claim 1, wherein said hardening step comprises curing said multicolored pattern.

8. The method of claim 7, wherein said curing step occurs simultaneous to said contacting step.

9. The method of claim 8, wherein said curing step comprises emitting radiation through said smoothing device to cure the multicolored pattern.

10. A method for making a color filter for a flat panel display, comprising:

mechanically forming a raised pattern on a transfer layer which is supported by a collector device, said raised pattern defining cell recesses having a width and a length;

depositing a plurality of colored inks into said recesses to form a multicolored pattern; and, using an adhesive, depositing the multicolored pattern from the collector device to a substrate to form a color filter, said adhesive applied between said multicolored pattern and said substrate.

11. The method of claim 10, further comprising, prior to or during said depositing step, contacting the multicolored pattern with a smoothing device to smooth the multicolored pattern while on the collector device.

12. The method of claim 11, further comprising curing said multicolored pattern prior to said depositing the multicolored filter pattern step.

13. The method of claim 12, wherein said curing step occurs simultaneous to said contacting step.

14. The method of claim 10, wherein prior to said depositing step, said adhesive is applied to the substrate.

15. The method of claim 10, wherein said method further comprises applying said adhesive to the multicolored pattern prior to said depositing step.

16. A method for making a color filter for a flat panel display, comprising:

forming a multicolored pattern on a collector device;

contacting the multicolored pattern with a smoothing device to smooth the multicolored pattern while on the collector device; and removing the multicolored pattern from the collector device to form a color filter component.

* * * * *